(12) United States Patent
Miyashita et al.

(10) Patent No.: US 7,928,615 B2
(45) Date of Patent: Apr. 19, 2011

(54) MOLDED MOTOR

(75) Inventors: Toshihito Miyashita, Nagano (JP);
Hiroshi Hioki, Nagano (JP); Masakazu Chikyu, Nagano (JP)

(73) Assignee: Sanyo Denki Co., Ltd., Tokyo (JP)

( * ) Notice: Subject to any disclaimer, the term of this patent is extended or adjusted under 35 U.S.C. 154(b) by 0 days.

(21) Appl. No.: 12/568,018

(22) Filed: Sep. 28, 2009

(65) Prior Publication Data

US 2010/0079014 A1    Apr. 1, 2010

(30) Foreign Application Priority Data

Sep. 29, 2008  (JP) ................................. 2008-250020
May 29, 2009  (JP) ................................. 2009-131477

(51) Int. Cl.
*H02K 1/04*  (2006.01)
(52) U.S. Cl. ........................................... 310/43; 310/64
(58) Field of Classification Search .................... 310/43, 310/64, 260
See application file for complete search history.

(56) References Cited

U.S. PATENT DOCUMENTS

| 3,084,418 A | * | 4/1963 | Procopio ....................... 264/262 |
| 3,685,926 A | * | 8/1972 | Blum ......................... 417/423.3 |
| 3,766,416 A | * | 10/1973 | Papst et al. ..................... 310/43 |
| 5,532,533 A | * | 7/1996 | Mizutani .................... 310/68 B |

FOREIGN PATENT DOCUMENTS

| JP | 2002-153008 | 5/2002 |
| JP | 2003-153486 | 5/2003 |

* cited by examiner

*Primary Examiner* — Dang D Le
(74) *Attorney, Agent, or Firm* — Rankin, Hill & Clark LLP

(57) ABSTRACT

A molded motor is provided that allows for ready installation of a heat-conducting member therein and is capable of improving dissipation of heat generated from the stator. The heat-conducting member is integrally formed with a load-side end bracket. The heat-conducting member includes a stopper surface that contacts an end surface of a stator core in the axial direction of a shaft, and an extended portion extending from the stopper surface toward a non-load-side end bracket to contact an outer peripheral surface of the stator core. The heat-conducting member is embedded in a molded portion with the stopper surface contacting the end surface of the stator core and the extended portion contacting the outer peripheral surface of the stator core.

6 Claims, 9 Drawing Sheets

MOLDED MOTOR

TECHNICAL FIELD

The present invention relates to a molded motor including a metal heat-conducting member that positively conducts heat generated from a stator with a plurality of winding portions to a load-side end bracket.

BACKGROUND ART

Japanese Patent No. 3845861 has proposed a motor including a cylindrical heat-conducting member made of aluminum and disposed on an outer peripheral portion of a stator core and contacting the stator core and a load-side end bracket. With the heat-conducting member, heat generated from a plurality of winding portions is conducted from the stator core to the load-side end bracket via the heat-conducting member to be dissipated to the outside. Japanese Patent No. 3780164 has proposed a molded motor in which a main portion of a stator is molded from a resin and a heat-conducting member of a metal bar is embedded in the resin and is in contact with a load-side end bracket but not with a stator core. With the heat-conducting member of a metal bar disposed in the resin, heat generated from a plurality of winding portions is conducted from the stator core to the resin, the heat-conducting member, and the load-side end bracket to be dissipated to the outside. With such heat dissipation through the heat-conducting member, it may be possible to prevent heat conduction to a non-load-side end bracket and hence damage to a rotational position detector, an electronic component, etc. disposed on the side of the non-load-side end bracket.

SUMMARY OF INVENTION

The conventional molded motors have a complicated mounting structure for the heat-conducting member, and also are laborious to produce. In addition, heat generated from the plurality of winding portions of the stator may not be sufficiently dissipated.

An object of the present invention is to provide a molded motor with a simple structure facilitating installation of a heat-conducting member in a molded portion.

Another object of the present invention is to provide a molded motor capable of sufficiently improving dissipation of heat generated from a plurality of winding portions.

Still another object of the present invention is to provide a molded motor in which an insulating resin forming a molded portion is prevented from cracking.

Yet another object of the present invention is to provide a molded motor capable of preventing entry of water from the outside into a stator.

A molded motor of which improvement is aimed at by the present invention comprises: a rotor having a shaft; a stator including a stator core disposed radially outwardly of the shaft, a plurality of winding portions formed on the stator core, and a molded portion made of an insulating resin and covering at least the plurality of winding portions; a load-side end bracket located on a load side of the motor and secured relative to the stator; a non-load-side end bracket located on a non-load side of the motor and secured relative to the stator; and a heat-conducting member connected to the stator to conduct heat generated from the stator to the load-side end bracket and integrally formed with the load-side end bracket. More specifically, the molded motor according to the present invention comprises a rotor having a shaft, a stator, a load-side end bracket made of a metal, a non-load-side end bracket, a pair of bearings, and a heat-conducting member made of a metal. The stator includes a stator core disposed radially outwardly of the shaft, a plurality of winding portions formed on the stator core, and a molded portion made of an insulating resin and covering at least the plurality of winding portions. The metal load-side end bracket is located on a load side of the motor in an axial direction of the shaft to contact one end portion of the stator and the one end portion is located on the load side of the motor. The non-load-side end bracket is located on a non-load-side of the motor in the axial direction of the shaft to contact the other end portion of the stator and the other end portion is located on the non-load side of the motor. As with the load-side end bracket, the non-load-side end bracket may also be made of a metal. The pair of bearings rotatably support the shaft with one bearing of the pair secured on the load-side end bracket and the other bearing of the pair secured on the non-load-side end bracket. The metal heat-conducting member is connected to the load-side end bracket to conduct heat generated from the stator to the load-side end bracket. The heat-conducting member is integrally formed with the load-side end bracket. The heat-conducting member includes a stopper surface that contacts the stator core to determine a position of the stator core in the axial direction.

According to the present invention, since the heat-conducting member is integrally formed with the load-side end bracket, the heat-conducting member may be formed together with the load-side end bracket by die casting, for example, thereby reducing the number of component parts. In addition, the heat conductivity from the heat-conducting member to the load-side end bracket is improved to increase dissipation of heat generated from the plurality of winding portions. Further, since the stopper surface contacts the stator core to determine the position of the stator core, it is easy to keep the heat-conducting member and the stator core in appropriate positional relationship during the formation of the molded portion, thereby facilitating the molding process.

The heat-conducting member may include a base portion located on a side of the load-side end bracket with respect to the stopper surface and an extended portion extending from the stopper surface toward the non-load-side end bracket to contact an outer peripheral surface of the stator core. Also, the heat-conducting member may be embedded in the molded portion. With this configuration, the heat-conducting member and the stator core may be kept in more appropriate positional relationship. Further, the heat-conducting member embedded in the molded portion may suppress reduction in the waterproof property of the molded portion.

Preferably, the load-side end bracket may be formed with a resin injection port through which the insulating resin is injected to form the molded portion, one or more through-holes are formed in a portion of the heat-conducting member that is located on the side of the load-side end bracket with respect to the stopper surface, and the through-holes penetrate the heat-conducting member in a radial direction of the shaft. Typically, a resin injection port through which a resin is injected during molding is formed in a mold. With the resin injection port formed in the load-side end bracket as described above, however, the mold may more freely be designed. In this configuration, the insulating resin for forming the molded portion, which has been injected from the resin injection port, pass through the one or more through-holes, thereby improving the flow of the resin. This ensures that a necessary amount of the resin is filled inside and outside the heat-conducting member.

Preferably, the base portion of the heat-conducting member may be thicker than the extended portion thereof, and the stopper surface may be located in an imaginary plane including a boundary plane between the base portion and the extended portion. This configuration may most simplify the structure of the heat-conducting member.

The heat-conducting member may have any shape. For example, the heat-conducting member may have a cylindrical shape. This increases the cross-sectional area of the heat-conducting member to improve the heat conductivity.

The heat-conducting member may include a plurality of plate-like heat-conducting members extending toward the non-load-side end bracket with one end of each plate-like heat-conducting member secured to the load-side end bracket, and the plate-like heat-conducting members may be disposed at intervals along an outer peripheral surface of the stator core. If the heat-conducting member is formed with such a plurality of plate-like heat-conducting members, the plurality of plate-like heat-conducting members are warped radially outwardly of the shaft in the process of causing the stator core to contact the stopper surface, thereby facilitating the assembly of the heat-conducting member and the stator core. In addition, the insulating resin for forming the molded portion flows through a slit formed between each two plate-like heat-conducting members, and thus the flow of the resin may be improved to ensure the formation of the molded portion.

The heat-conducting member may include a base portion located on a side of the load-side end bracket with respect to the stopper surface, a cylindrical inner extended portion extending from the stopper surface toward the non-load-side end bracket to contact the stator core, and a cylindrical outer extended portion located radially outwardly of the inner extended portion and concentrically disposed therewith. In this configuration, the outer extended portion may be longer than the inner extended portion as measured in the axial direction, and an annular groove portion, into which the insulating resin that forms the molded portion is filled, may be formed between the inner extended portion and the outer extended portion. Heat generated from the stator is conducted to the load-side end bracket through the inner extended portion and the base portion. A portion of the insulating resin of the molded portion that is located radially outwardly of the inner extended portion is surrounded by the outer extended portion. It is thus possible to prevent cracking of that portion of the insulating resin of the molded portion even if the inner extended portion is thermally expanded or contracted. The inner extended portion and the outer extended portion form a labyrinth structure, thereby effectively preventing entry of water from the outside into the stator.

A recessed portion opening radially outwardly and toward the load-side end bracket may be formed at an end of the stator core, and the inner extended portion may be fitted in the recessed portion. With this configuration, the heat-conducting member and the stator core are kept in more appropriate positional relationship by firmly securing the heat-conducting member and the stator core.

An O-ring may be disposed in the groove portion to contact the inner extended portion, the outer extended portion, and the base portion. Entry of water from the outside into the stator is further reliably prevented by the O-ring.

A plurality of screw through-holes may be formed in the non-load-side end bracket, and a plurality of screw holes may be formed in the outer extended portion. In this configuration, the non-load-side end bracket and the load-side end bracket may be coupled to each other via the stator by a plurality of screws passing through the plurality of screw through-holes and screwed into the plurality of screw holes. Since the plurality of screw holes are formed in the outer extended portion of the load-side end bracket, the screws are located close to the non-load-side end bracket. This suppresses thermal expansion and thermal contraction of the inner extended portion in the radial direction, thereby further reliably preventing cracking of the insulating resin.

The load-side end bracket may be formed with a resin injection port through which the insulating resin is injected to form the molded portion. With this configuration, the insulating resin injected through the resin injection port flows through a slot between each two adjacent magnetic poles of the stator core toward the non-load-side end bracket.

Preferably, a plurality of screw holes may be formed in one of the load-side end bracket and the non-load-side end bracket, a plurality of screw through-holes may be formed in the other of the load-side end bracket and the non-load-side end bracket, and the non-load-side end bracket and the load-side end bracket are coupled to each other via the stator by a plurality of screws passing through the plurality of screw through-holes and screwed into the plurality of screw holes. With this configuration, the stator core and the non-load-side end bracket are electrically connected to each other through the heat-conducting member, the load-side end bracket, and the screws. It is thus not necessary to provide separate earth conductors for the stator core and the non-load-side end bracket.

DESCRIPTION OF EMBODIMENTS

Figure 1:
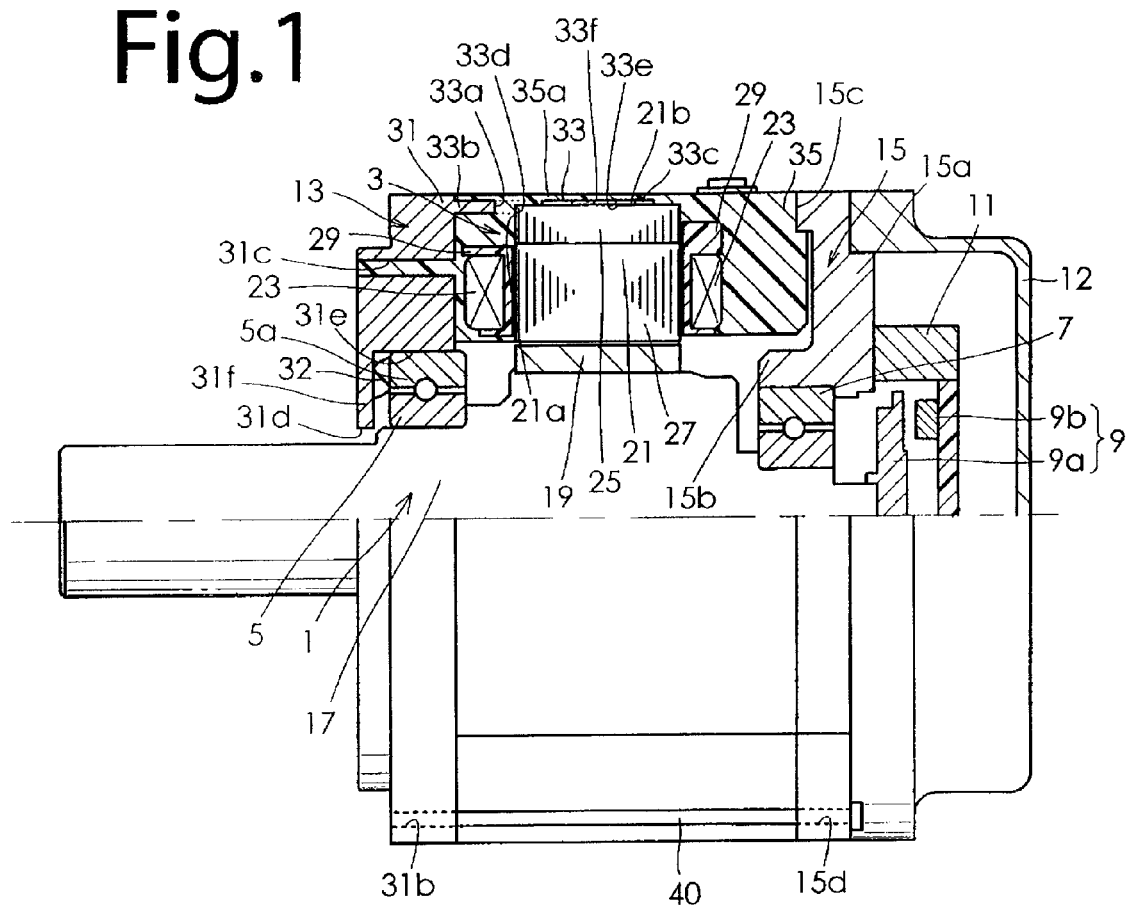
FIG. 1 shows a molded motor according to an embodiment of the present invention with a half of the molded motor cut away.

Now, embodiments of the present invention will be hereinafter described in detail with reference to the drawings. FIG. 1 shows a molded motor according to an embodiment of the present invention with a half of the molded motor cut away. As shown in FIG. 1, the molded motor according to the embodiment comprises a rotor 1, a stator 3, a pair of ball bearings 5 and 7, a magnetic rotary encoder 9 which serves as a rotational position detector, a cover member 11, a casing 12, a bracket assembly 13 including a load-side end bracket 31 and a heat-conducting member 33, and a non-load-side end bracket 15. The rotor 1 includes a shaft 17 supported rotatably by the pair of bearings 5, 7 and rotor magnetic poles 19 secured to the outer periphery of the shaft 17. The rotor magnetic poles 19 include a plurality of permanent magnets secured to the outer peripheral portion of the shaft 17.

The stator 3 includes a stator core 21, a plurality of winding portions 23, and a molded portion 35. The stator core 21 is formed by stacking a plurality of magnetic steel plates on each other. The stator core 21 is disposed radially outwardly of the shaft 17, and includes a cylindrical yoke 25 and a plurality of magnetic poles 27 projecting from the yoke 25 toward the shaft 17 to face the rotor magnetic poles 19. The plurality of winding portions 23 are respectively formed by winding a wire around the plurality of magnetic poles 27 of the stator core 21 via an insulator 29 made of an electrically insulating material. The molded portion 35 is made of a thermosetting insulating resin, and covers a part of the stator core 21 and the plurality of winding portions 23.

The magnetic rotary encoder 9, which serves as a rotational position detector, is disposed outside of the non-load-side end bracket 15. The magnetic rotary encoder 9 includes a rotary element 9a secured to an end portion, located on the non-load-side of the motor, of the shaft 17 and a magnetic detector 9b, which may be a Hall element, secured to the cover member 11. The rotary element 9a has a disk shape, and includes a plurality of permanent magnet portions. The magnetic detector 9b is disposed facing the plurality of permanent magnet portions to detect the polarities of the plurality of permanent magnet portions. This configuration allows detection of the rotational position of the shaft 17. Here, an optical rotary encoder may be used as the rotational position detector.

The bracket assembly 13 is disposed on an axial end of the shaft 17, located on a load side of the motor. The bracket assembly includes a metal load-side end bracket 31 and a metal heat-conducting member 33 to be discussed later that are integrally formed with each other. A load is connected to an end portion of the shaft 17 that projects from the load-side end bracket 31 in the axial direction of the shaft 17. The non-load-side end bracket 15 is made of a metal, and disposed on an axial end of the shaft 17, located on a non-load side of the motor.

Figure 2:
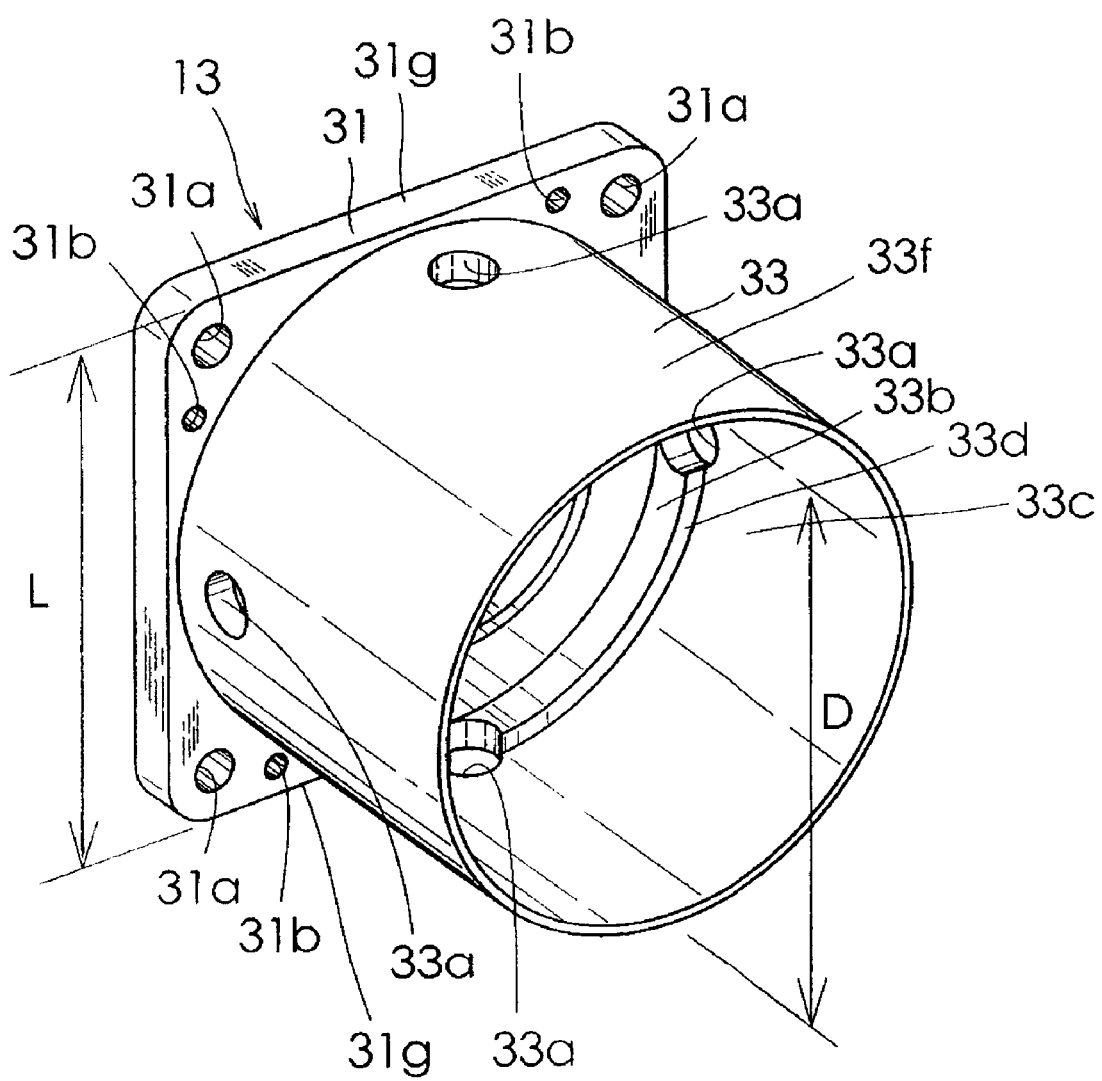
FIG. 2 is a perspective view of a bracket assembly for use in the molded motor of FIG. 1.

As shown in the perspective view of FIG. 2, the load-side end bracket 31 is made of aluminum by die casting, and contacts the load-side end of the stator 3 (the load-side end of the molded portion 35). A mounting hole 31a for mounting the molded motor to a mount member is formed at each of the four corners of the load-side end bracket 31. A screw hole 31b is formed in proximity to each of the four mounting holes 31a. A resin injection port 31c shown in FIG. 1 is formed between each two adjacent mounting holes 31a. A shaft through-hole 31d that allows the shaft 17 to pass through is formed in the center of the load-side end bracket 31. An annular recessed portion 31e that opens toward the non-load-side end bracket 15 is formed around the shaft through-hole 31d. The load-side end bracket 31 is thus formed with a wall portion 31f that forms the bottom of the annular recessed portion 31e. One of the pair of ball bearings 5, 7, namely the ball bearing 5, is fitted in the annular recessed portion 31e. An annular spring member 32 that urges the ball bearing 5 toward the non-load-side end bracket 15 is disposed between an outer race 5a of the ball bearing 5 and the wall portion 31f.

As shown in FIG. 2, the heat-conducting member 33 has a cylindrical shape, and is integrally formed with the load-side end bracket 31. The outside diameter D of the heat-conducting member 33 is slightly smaller than the distance L between two opposed side surfaces 31g of the load-side end bracket 31. The heat-conducting member 33 includes a base portion 33b and an extended portion 33c. The base portion 33b has a cylindrical shape, and extends from the load-side end bracket 31 toward the non-load-side end bracket 15. The extended portion 33c also has a cylindrical shape, and extends from an end portion of the base portion 33b toward the non-load-side end bracket 15. A portion of an end surface of the base portion 33b that is located on the shaft 17 side with respect to the extended portion 33c forms a stopper surface 33d. The stopper surface 33d contacts a portion of an end surface 21a of the stator core 21 that is located on the load side of the motor in the axial direction of the shaft 17. Thus, as considered in the axial direction of the shaft 17, the base portion 33b is located on the side of the load-side end bracket 31 with respect to the stopper surface 33d, and the extended portion 33c extends toward the non-load-side end bracket 15 from the location of the stopper surface 33d. The base portion 33b is thicker than the extended portion 33c, and the stopper surface 33d is located in an imaginary plane including the boundary plane between the base portion 33b and the extended portion 33c. The heat-conducting member 33 is embedded in the molded portion 35 with the stopper surface 33d contacting the end surface 21a of the stator core 21 and the extended portion 33c contacting an outer peripheral surface 21b of the stator core 21. The stopper surface 33d contacts the end surface 21a of the stator core 21 to determine the position of the stator core 21 in the axial direction. The heat-conducting member 33 further includes four through-holes 33a that penetrate the heat-conducting member 33 in radial directions of the shaft 17 across the stopper surface 33d. The four through-holes 33a are disposed at angular intervals of 90° in the circumferential direction. The through-holes 33a allow an insulating resin for forming the molded portion 35 to pass through. This improves the flow of the resin to ensure the formation of necessary resin layers inside and outside the heat-conducting member 33. Moreover, a portion 35a of the molded portion 35 that covers the outer side of the heat-conducting member 33 prevents entry of water into the stator core 21.

The non-load-side end bracket 15 is made of aluminum by die casting, and contacts the non-load-side end of the stator 3 (the non-load-side end of the molded portion 35). The non-load-side end bracket 15 includes a bracket body 15a extending radially, an annular inner rib 15b integrally formed with the bracket body 15a to project from the bracket body 15a in the axial direction, and an annular outer rib 15c integrally formed with the bracket body 15a and located radially outwardly of the inner rib 15b. The bracket body 15a has the shape of a rectangular flange. A screw through-hole 15d is formed in a portion of the bracket body 15a that corresponds to each screw hole 31b of the load-side end bracket 31. Four metal screws 40 are inserted through the screw through-holes 15d of the bracket body 15a and screwed into the screw holes 31b of the load-side end bracket 31 to couple the load-side end bracket 31 and the non-load-side end bracket 15 via the stator 3.

The other of the pair of ball bearings 5 and 7, namely the ball bearing 7, is fitted with the inner peripheral surface of the inner rib 15b of the non-load-side end bracket 15.

In the embodiment, the molded portion 35 is formed as follows. First, a mold that surrounds the stator core 21 and the heat-conducting member 33 is placed in position with the stopper surface 33d contacting the end surface 21a of the stator core 21 and an inner peripheral surface 33e of the extended portion 33c contacting the outer peripheral surface 21b of the stator core 21. An insulating resin is then injected into the mold from the resin injection ports 31c. If the resin is injected in this way, a part of the injected resin flows from an area surrounded by the base portion 33b through a slot between each two adjacent magnetic poles 27 to an area adjacent to the non-load-side end bracket 15. Another part of the injected resin flows through the four through-holes 33*a* to an area over an outer peripheral portion 33*f* of the heat-conducting member 33. The resin is thereafter cured in the mold, completing the formation of the molded portion 35.

In the molded motor according to the embodiment, heat generated from the plurality of winding portions 23 is conducted via the stator core 21 and the heat-conducting member 33 to the load-side end bracket 31 to be dissipated to the outside. Thus, heat generated from the plurality of winding portions 23 is dissipated to the outside without being conducted to the magnetic rotary encoder 9, which is disposed on the outer side of the non-load-side end bracket 15. In the molded motor according to the embodiment, the load-side end bracket 31 and the heat-conducting member 33 are integrally formed with each other. Therefore, the heat-conducting member 33 may be easily formed together with the load-side end bracket by die casting, for example, reducing the number of component parts. With the load-side end bracket 31 and the heat-conducting member 33 integrally formed with each other as described above, the heat conductivity from the heat-conducting member 33 to the load-side end bracket 31 is improved to increase dissipation effect of heat generated from the plurality of winding portions 23.

Figure 3:
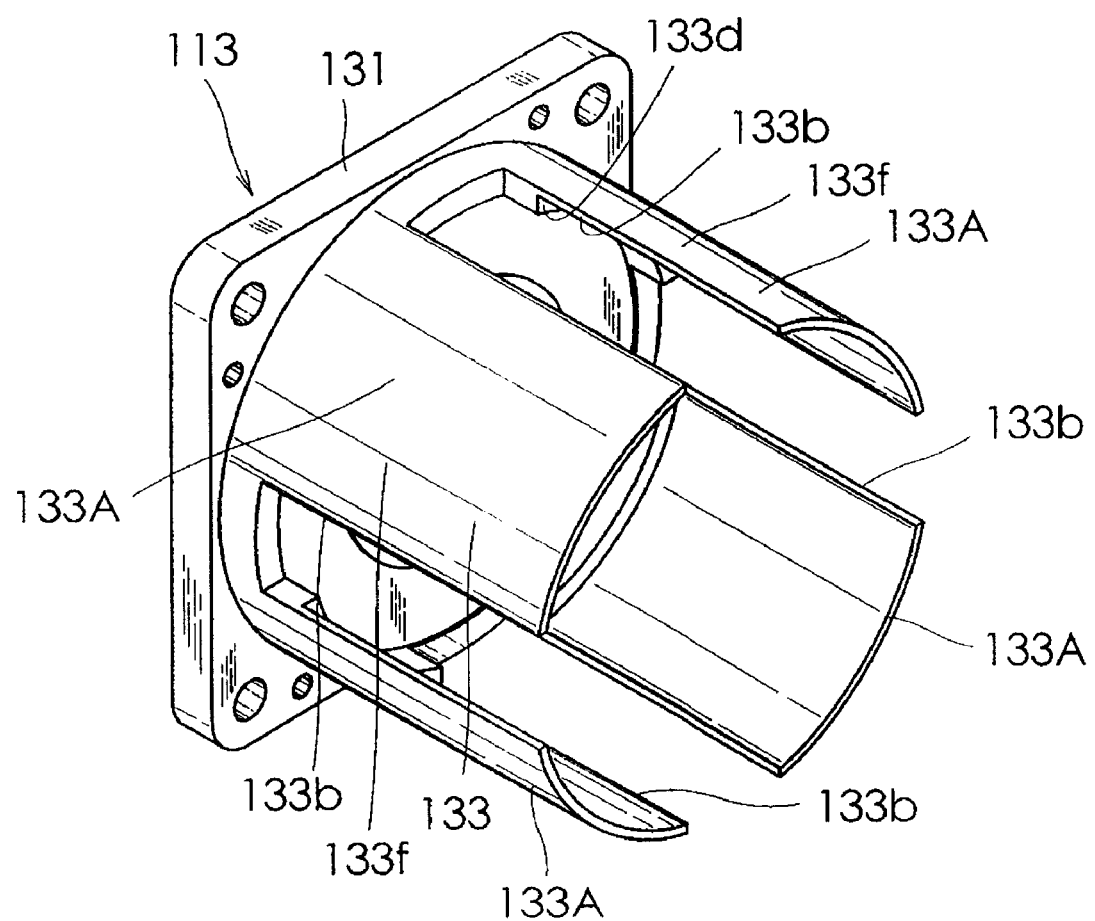
FIG. 3 is a perspective view of a bracket assembly for use in a molded motor according to another embodiment of the present invention.

FIG. 3 is a perspective view of a bracket assembly 113 for use in a molded motor according to another embodiment of the present invention. The bracket assembly 113 according to the embodiment and the bracket assembly 13 for use in the molded motor according to the embodiment shown in FIGS. 1 and 2 are different from each other only in the structure of the heat-conducting member, and have the same structure as each other in the remaining part (the load-side end bracket). Thus, component parts that are the same as those shown in FIG. 2 are denoted by reference numerals obtained by adding 100 to the reference numerals affixed to their counterparts in FIG. 2 and their descriptions are omitted. The heat-conducting member 133 of the bracket assembly 113 according to the embodiment includes four plate-like heat-conducting members 133A extending toward the non-load-side end bracket 15 with one end of each plate-like heat-conducting member 133A secured to the load-side end bracket 131. The plate-like heat-conducting members 133A are disposed at intervals along an outer peripheral surface 21*b* of the stator core 21. A slit 133*b* is thus formed between each two adjacent plate-like heat-conducting members 133A. The four slits 133*b* are disposed at regular intervals (at an angle of 90°) in the circumferential direction. Each slit 133*b* opens in the thickness direction of the heat-conducting member 133 and toward the non-load-side end bracket. In the bracket assembly 113 according to the embodiment, a part of the resin injected during molding flows through the four slits 133*b* to an area over an outer peripheral portion 133*f* of the heat-conducting member 133. If the bracket assembly 113 according to the embodiment is used, the plurality of plate-like heat-conducting members 133A are warped radially outwardly of the shaft 17 in the process of causing the stator core 21 to contact the stopper surface 133*d*, thereby facilitating the assembly of the heat-conducting member 133 and the stator core 21. Although the heat conductivity may be reduced compared to the molded motor shown in FIGS. 1 and 2, the flow of the resin is improved to ensure the formation of the molded portion.

Figure 4:
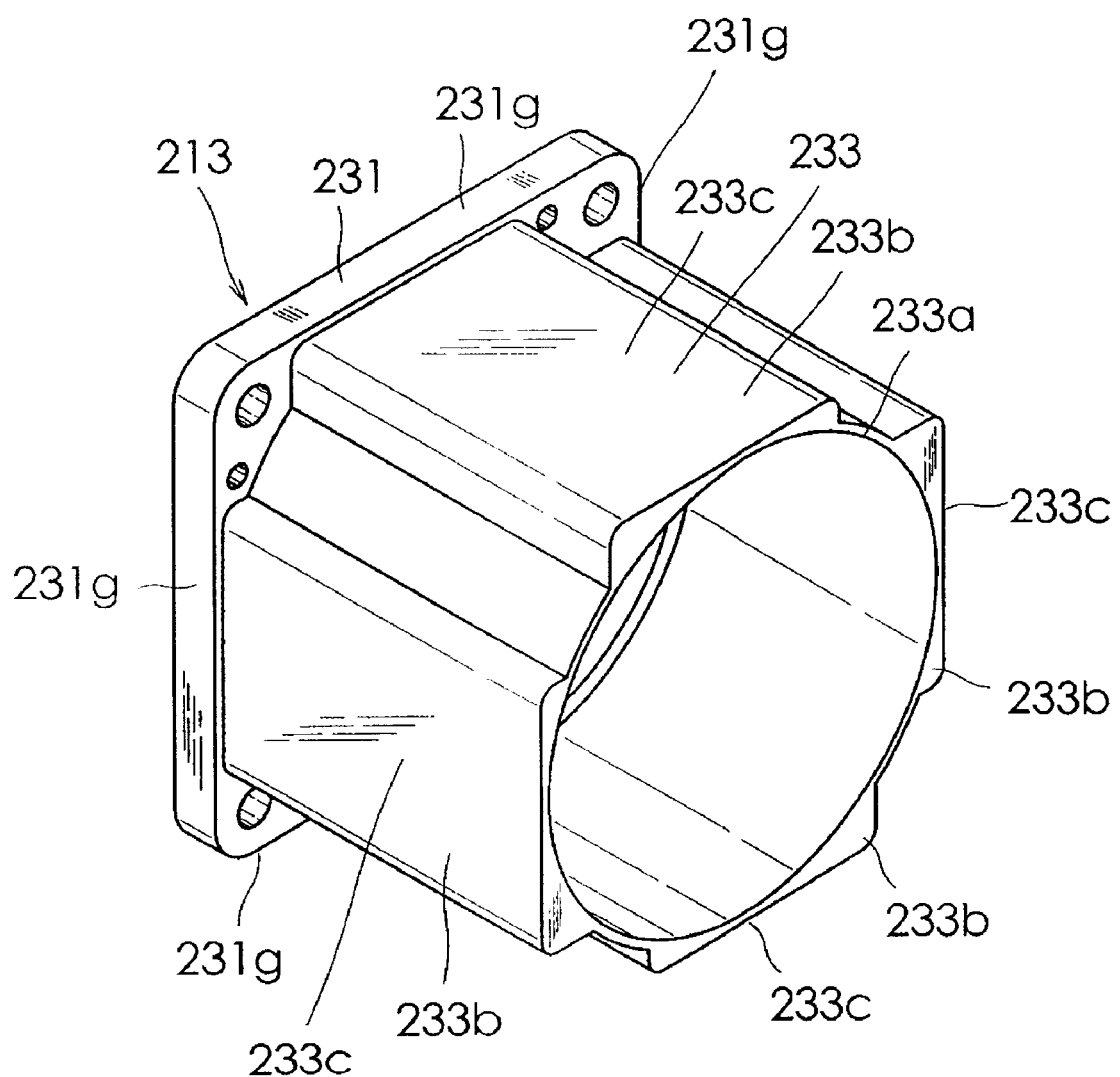
FIG. 4 is a perspective view of a bracket assembly for use in a molded motor according to still another embodiment of the present invention.

FIG. 4 is a perspective view of a bracket assembly 213 for use in a molded motor according to still another embodiment of the present invention. The bracket assembly 213 according to the embodiment and the bracket assembly 13 for use in the molded motor according to the embodiment shown in FIGS. 1 and 2 are different from each other only in the structure of the heat-conducting member, and have the same structure as each other in the remaining part (the load-side end bracket). Thus, component parts that are the same as those shown in FIG. 2 are denoted by reference numerals obtained by adding 200 to the reference numerals affixed to their counterparts in FIG. 2 and their descriptions are omitted. The heat-conducting member 233 of the bracket assembly 213 according to the embodiment has no resin through-holes. The heat-conducting member 233 includes, integrally formed therewith, a cylindrical portion 233*a* and four thickened portions 233*b*. The thickened portions 233*b* are disposed at regular intervals (at an angle of 90°) in the circumferential direction of the cylindrical heat-conducting member 233. An outer peripheral portion 233*c* of each thickened portion 233*b* extends in parallel with a corresponding one of four side surfaces 231*g* of the load-side end bracket 231. In the molded motor with the bracket assembly 213, when an insulating resin is injected into the mold from the resin injection ports, the injected resin flows through a slot between each two adjacent magnetic poles 27 toward the non-load-side end bracket 15.

Figure 5:
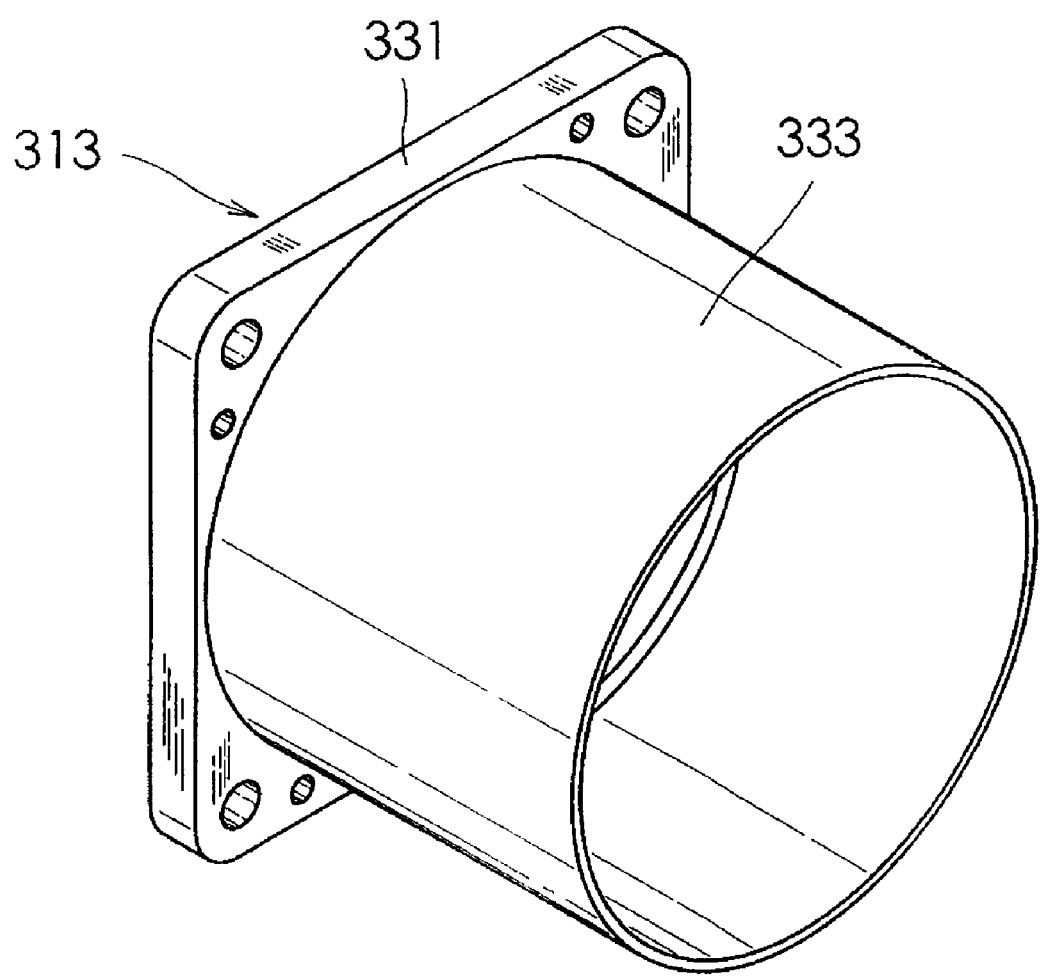
FIG. 5 is a perspective view of a bracket assembly for use in a molded motor according to yet another embodiment of the present invention.

FIG. 5 is a perspective view of a bracket assembly 313 for use in a molded motor according to yet another embodiment of the present invention. The bracket assembly 313 according to the embodiment has no resin through-holes. Except for that point, the bracket assembly 313 and the bracket assembly 13 for use in the molded motor according to the embodiment shown in FIGS. 1 and 2 have the same structure as each other. In the molded motor with the bracket assembly 313, when an insulating resin is injected into the mold from the resin injection ports, the injected resin flows through a slot between each two adjacent magnetic poles 27 toward the non-load-side end bracket 15.

Figure 6:
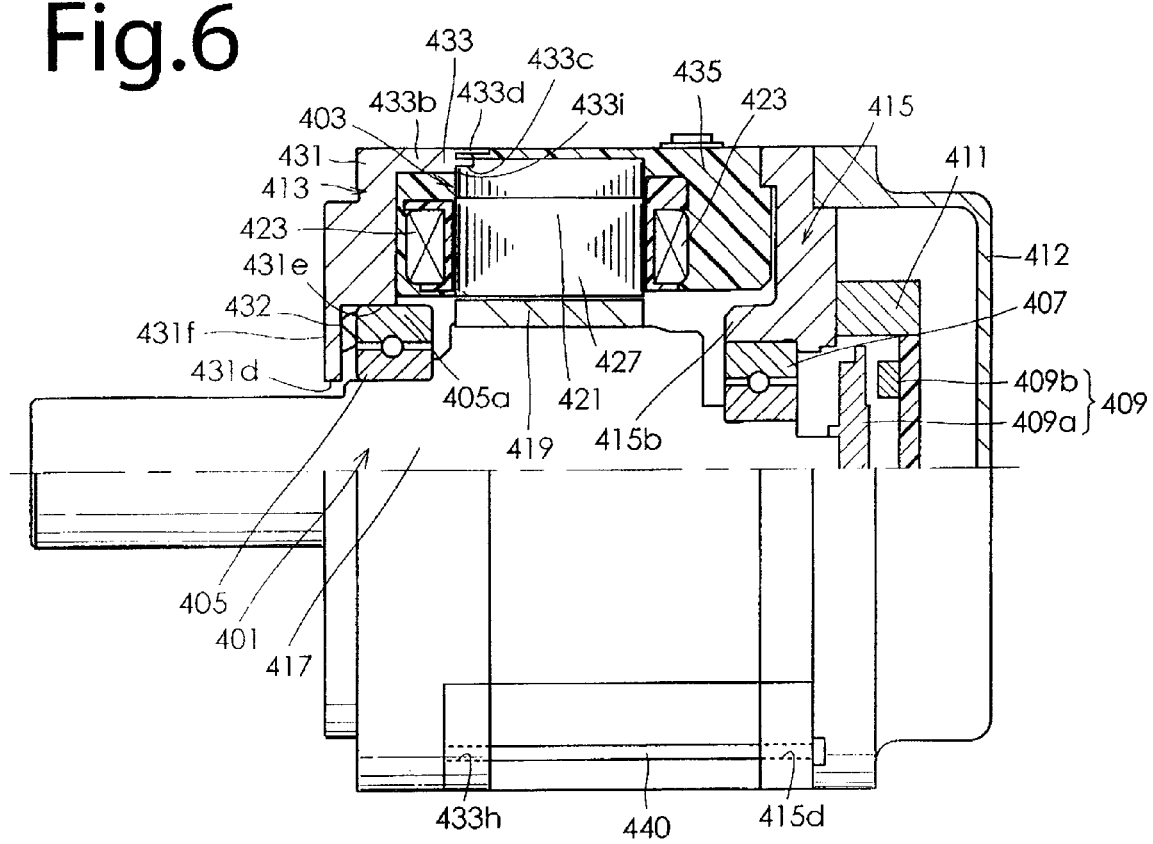
FIG. 6 shows a molded motor according to another embodiment of the present invention with a half of the molded motor cut away.

FIG. 6 shows a molded motor according to another embodiment of the present invention with a half of the molded motor cut away. The molded motor according to the embodiment has a stator core 421 and a bracket assembly 413. Except for that point, the molded motor according to the embodiment and the molded motor shown in FIG. 1 have the same structure as each other. Thus, component parts that are the same as those shown in FIG. 1 are denoted by reference numerals obtained by adding 400 to the reference numerals affixed to their counterparts in FIG. 1 and their descriptions are omitted.

Figure 7:
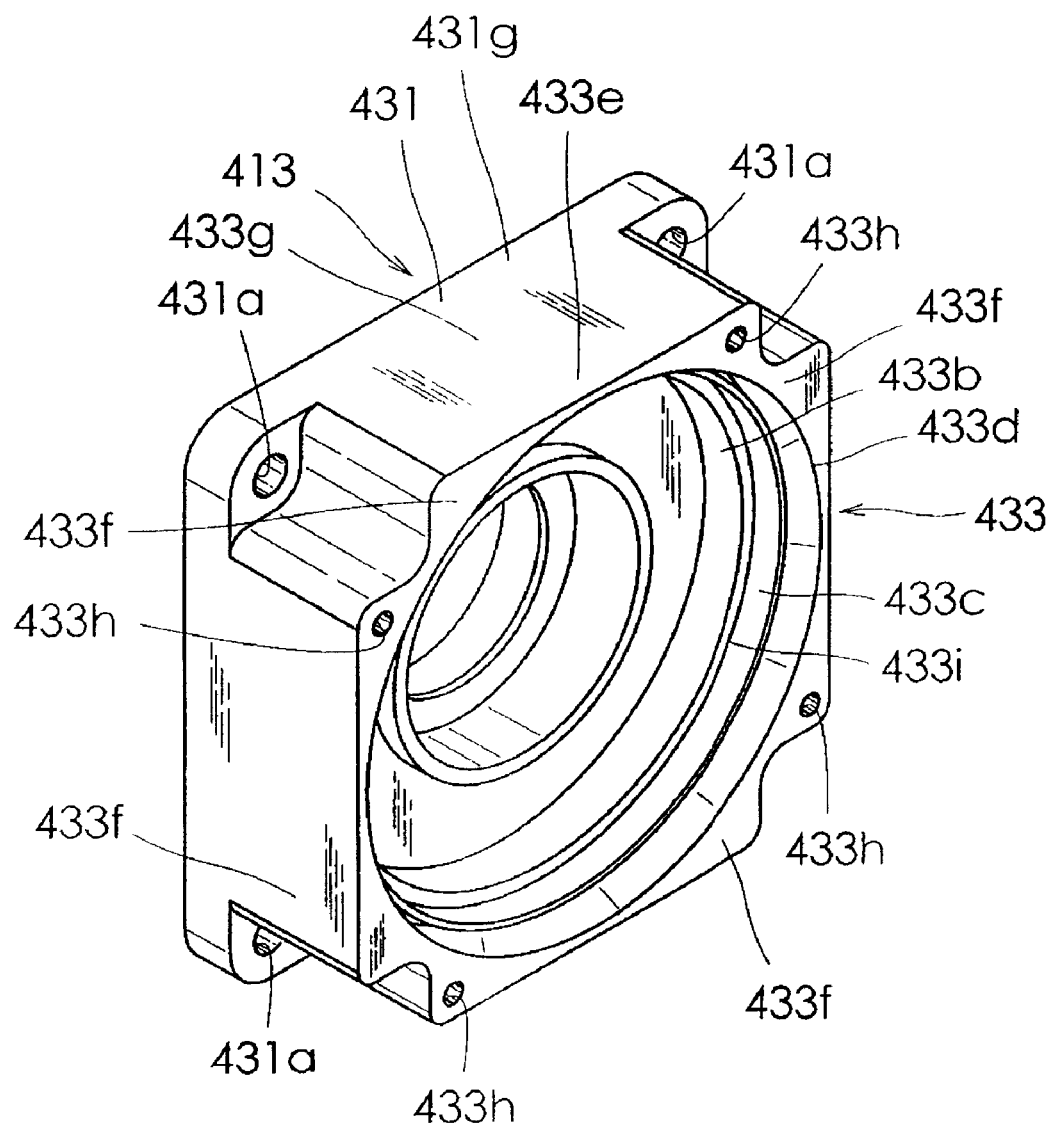
FIG. 7 is a perspective view of a bracket assembly for use in the molded motor of FIG. 6.

The bracket assembly 413 includes a load-side end bracket 431 and a heat-conducting member 433 integrally molded with each other. As shown in FIG. 7, the load-side end bracket 431 is made of aluminum by die casting, and a mounting hole 431*a* for mounting the molded motor to a mount member is formed at each of the four corners of the load-side end bracket 431. Also, as shown in FIG. 6, a shaft through-hole 431*d* that allows the shaft 417 to pass through is formed in the center of the load-side end bracket 431. An annular recessed portion 431*e* that opens toward the non-load-side end bracket 415 is formed around the shaft through-hole 431*d*. The load-side end bracket 431 is thus formed with a wall portion 431*f* that forms the bottom of the annular recessed portion 431*e*. One of the pair of ball bearings 405 and 407, namely the ball bearing 405, is fitted in the annular recessed portion 431*e*. An annular spring member 432 that urges the ball bearing 405 toward the non-load-side end bracket 415 is disposed between an outer race 405*a* of the ball bearing 405 and the wall portion 431*f*.

Figure 8:
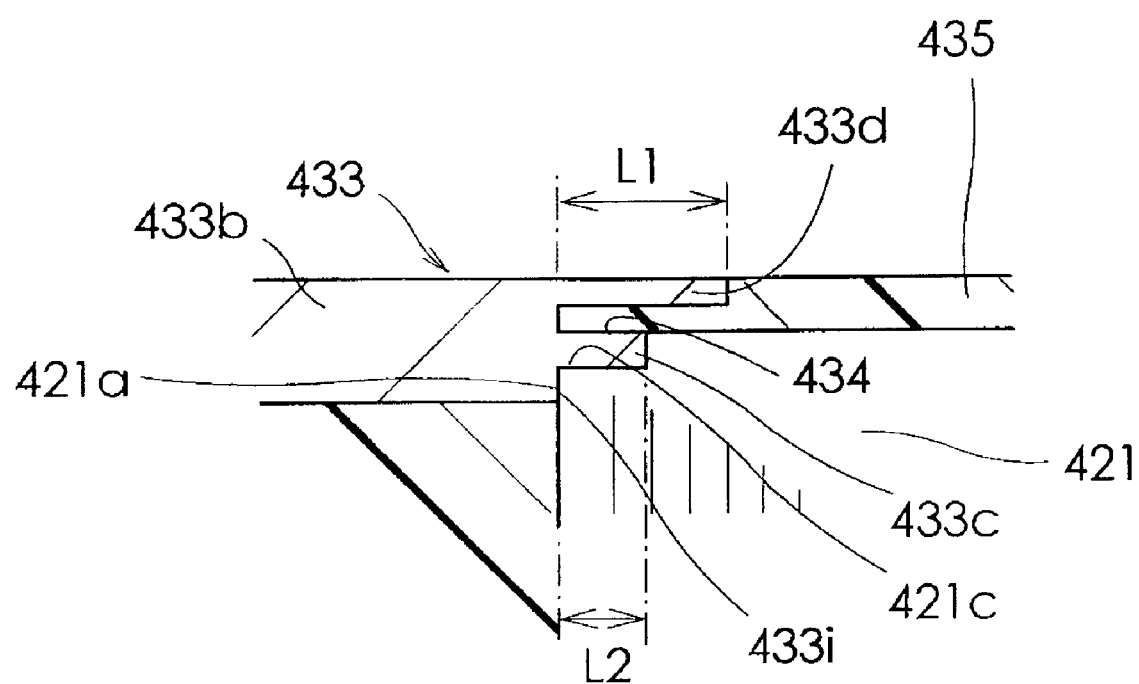
FIG. 8 is a partial enlarged view of FIG. 6.

The heat-conducting member 433 is integrally formed with the load-side end bracket 431, and includes a base portion 433*b*, an inner extended portion 433*c*, and an outer extended portion 433*d*. The base portion 433*b* has a cylindrical shape, and extends from the load-side end bracket 431 toward the non-load-side end bracket 415. The inner extended portion 433c and the outer extended portion 433d extend from an end portion of the base portion 433b toward the non-load-side end bracket 415. As shown in FIG. 8 which is a partial enlarged view of FIG. 6, a portion of an end surface of the base portion 433b that is located on the shaft 417 side with respect to the inner extended portion 433c forms a stopper surface 433i. The stopper surface 433i contacts a portion of an end surface 421a of the stator core 421 that is located on the load side in the axial direction of the shaft 417. Thus, as considered in the axial direction of the shaft 417, the base portion 433b is located on the side of the load-side end bracket 431 with respect to the stopper surface 433i, and the inner extended portion 433c extends toward the non-load-side end bracket 415 from the location of the stopper surface 433i. The stopper surface 433i contacts the end surface 421a of the stator core 421 to determine the axial position of the stator core 421. The inner extended portion 433c has a cylindrical shape, and is fitted in a recessed portion 421c of the stator core 421. The recessed portion 421c is formed at an end portion of the stator core 421, and opens radially outwardly of the shaft 417 and toward the load-side end bracket 431. The inner extended portion 433c is embedded in the molded portion 435 with the stopper surface 433i contacting the end surface 421a of the stator core 421.

The outer extended portion 433d also has a cylindrical shape, and is located radially outwardly of the inner extended portion 433c and concentrically disposed with the inner extended portion 433c. As shown in FIG. 7, the outer extended portion 433d includes a cylindrical portion 433e and four thickened portions 433f that are integrally formed with each other. The thickened portions 433f are disposed at regular intervals (at an angle of 90°) in the circumferential direction of the cylindrical portion 433e. An outer peripheral portion 433g of each thickened portion 433f extends in parallel with a corresponding one of four side surfaces 431g of the load-side end bracket 431. A screw hole 433h that opens toward the non-load-side end bracket 415 is formed in each of the four thickened portions 433f. As shown in FIG. 8, the axial length L1 of the outer extended portion 433d is greater than the axial length L2 of the inner extended portion 433c. In the embodiment, the length L1 is approximately twice the length L2. An annular groove portion 434, into which the insulating resin that forms the molded portion 435 is filled, is formed between the inner extended portion 433c and the outer extended portion 433d.

In the molded motor according to the embodiment, as shown in FIG. 6, four screws 440 are inserted through the four screw through-holes 415d of the non-load-side end bracket 415 and screwed into the four screw holes 433h of the outer extended portion 433d to couple the load-side end bracket 431 and the non-load-side end bracket 415 via the stator 403.

In the embodiment, the molded portion 435 is formed as follows. A mold that surrounds the stator core 421 and the heat-conducting member 433 is placed in position with the inner extended portion 433c fitted in the recessed portion 421c of the stator core 421 (FIG. 8). An insulating resin is then injected into the mold from a resin injection port of the mold. If the resin is injected in this way, a part of the injected resin flows through a slot between each two adjacent magnetic poles 427 to an area surrounded by the base portion 433b. Another part of the injected resin flows over the outer peripheral surface of the stator core 421 to be filled into the annular groove portion 434 (FIG. 8). The resin is thereafter cured in the mold, completing the formation of the molded portion 435.

Figure 9:
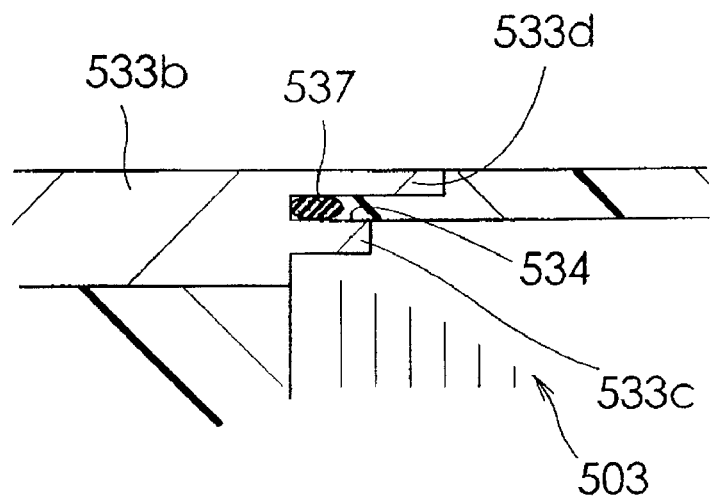
FIG. 9 is a partial enlarged view of a cross section of a molded motor according to still another embodiment of the present invention.

In the molded motor according to the embodiment, heat generated from the plurality of winding portions 423 is conducted via the stator core 421 and the inner extended portion 433c and the base portion 433b of the heat-conducting member 433 to the load-side end bracket 431 to be dissipated to the outside. In the molded motor according to the embodiment, a portion of the insulating resin of the molded portion 435 that is located radially outwardly of the inner extended portion 433c is surrounded by the outer extended portion 433d. It is thus possible to prevent cracking of that portion of the insulating resin of the molded portion 435 even if the inner extended portion 433c is thermally expanded or contracted. With the inner extended portion 433c and the outer extended portion 433d forming a labyrinth structure, entry of water from the outside into the stator 403 is reliably prevented. FIG. 9 is a partial enlarged view of a cross section of a molded motor according to still another embodiment of the present invention. In the molded motor according to the embodiment, an O-ring 537 is disposed in the annular groove portion 534 between the inner extended portion 533c and the outer extended portion 533d. The O-ring 537 is made of a heat-resistant fluoro-rubber, and disposed to contact the inner extended portion 533c, the outer extended portion 533d, and the base portion 533b. Since the O-ring 537 has high heat resistance, it is not melted by heat of the insulating resin during the formation of the molded portion.

In the molded motor according to the embodiment, entry of water from the outside into the stator 503 may further be reliably prevented by the O-ring 537.

Figure 10:
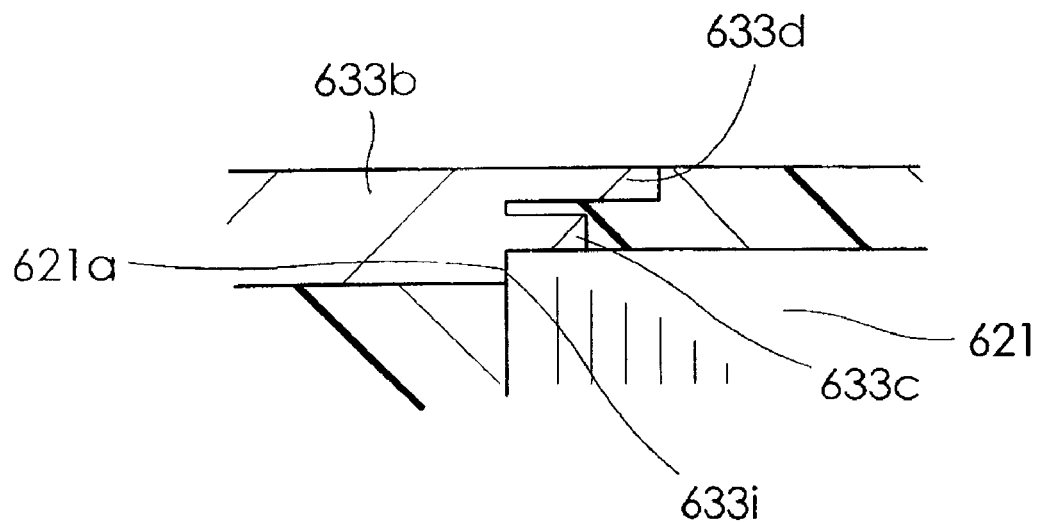
FIG. 10 is a partial enlarged view of a cross section of a molded motor according to yet another embodiment of the present invention.

FIG. 10 is a partial enlarged view of a cross section of a molded motor according to yet another embodiment of the present invention. In the molded motor according to the embodiment, the stator core 621 does not have a recessed portion in which the inner extended portion 633c is to be fitted. In the embodiment, the stopper surface 633i of the base portion 633b contacts the end surface 621a of the stator core 621, and the inner peripheral surface of the inner extended portion 633c contacts the outer peripheral surface of the stator core 621.

In the molded motor according to the embodiment, the stator core 621 may have a simple structure.

While certain features of the invention have been described with reference to example embodiments, the description is not intended to be construed in a limiting sense. Various modifications of the example embodiments, as well as other embodiments of the invention, which are apparent to persons skilled in the art to which the invention pertains are deemed to lie within the spirit and scope of the invention.

What is claimed is:

1. A molded motor comprising:
  a rotor having a shaft;
  a stator including a stator core disposed radially outwardly of the shaft, a plurality of winding portions formed on the stator core, and a molded portion made of an insulating resin and covering at least the plurality of winding portions;
  a load-side end bracket located on a load side of the motor and secured relative to the stator;
  a non-load-side end bracket located on a non-load side of the motor and secured relative to the stator; and
  a heat-conducting member connected to the stator to conduct heat generated from the stator to the load-side end bracket and integrally formed with the load-side end bracket, said heat-conducting member including a stopper surface that contacts one end of the stator core to determine a position of the stator core in an axial direction of the stator, wherein
  the heat-conducting member includes a plurality of plate-like heat-conducting members extending toward the non-load-side end bracket with one end of each plate-like heat-conducting member secured to the load-side end bracket, the plate-like heat-conducting members being disposed at intervals along an outer peripheral surface of the stator core.

2. A molded motor comprising:

a rotor having a shaft;

a stator including a stator core disposed radially outwardly of the shaft, a plurality of winding portions formed on the stator core, and a molded portion made of an insulating resin and covering at least the plurality of winding portions;

a load-side end bracket located on a load side of the motor and secured relative to the stator;

a non-load-side end bracket located on a non-load side of the motor and secured relative to the stator; and a heat-conducting member connected to the stator to conduct heat generated from the stator to the load-side end bracket and integrally formed with the load-side end bracket, said heat-conducting member including a stopper surface that contacts one end of the stator core to determine a position of the stator core in an axial direction of the stator, wherein the heat-conducting member includes a base portion located on a side of the load-side end bracket with respect to the stopper surface, a cylindrical inner extended portion extending from the stopper surface toward the non-load-side end bracket to contact the stator core, and a cylindrical outer extended portion located radially outwardly of the inner extended portion and concentrically disposed therewith;

the outer extended portion is longer than the inner extended portion as measured in the axial direction; and an annular groove portion, into which the insulating resin that forms the molded portion is filled, is formed between the inner extended portion and the outer extended portion.

3. The molded motor according to claim 2, wherein a recessed portion opening radially outwardly and toward the load-side end bracket is formed in an end of the stator core; and the inner extended portion is fitted in the recessed portion.

4. The molded motor according to claim 2, wherein an O-ring is disposed in the groove portion to contact the inner extended portion, the outer extended portion, and the base portion.

5. The molded motor according to claim 2, wherein a plurality of screw through-holes are formed in the non-load-side end bracket;

a plurality of screw holes are formed in the outer extended portion; and the non-load-side end bracket and the load-side end bracket are coupled to each other via the stator by a plurality of screws passing through the plurality of screw through-holes and screwed into the plurality of screw holes.

6. The molded motor according to claim 2, wherein the load-side end bracket is formed with a resin injection port through which the insulating resin is injected to form the molded portion.

\* \* \* \* \*